(12) United States Patent
Aranda Perez

(10) Patent No.: US 10,843,367 B2
(45) Date of Patent: Nov. 24, 2020

(54) MACHINE FOR CUTTING SHEETS BY FLUID PROJECTION

(71) Applicant: GOITI, S.COOP., Elgoibar Guipuzcoa (ES)

(72) Inventor: Miguel Angel Aranda Perez, Elgoibar Guipuzcoa (ES)

(73) Assignee: GOITI, S.COOP., Elgoibar Guipuzcoa (ES)

( * ) Notice: Subject to any disclaimer, the term of this patent is extended or adjusted under 35 U.S.C. 154(b) by 0 days.

(21) Appl. No.: 16/403,911

(22) Filed: May 6, 2019

(65) Prior Publication Data
US 2019/0337093 A1 Nov. 7, 2019

(30) Foreign Application Priority Data
May 7, 2018 (ES) .................... 201830447

(51) Int. Cl.
*B23K 26/08* (2014.01)
*B23K 26/14* (2014.01)
(Continued)

(52) U.S. Cl.
CPC .......... *B26F 3/004* (2013.01); *B23K 26/0846* (2013.01); *B23K 26/14* (2013.01); *B23K 2101/16* (2018.08); *B23K 2101/18* (2018.08)

(58) Field of Classification Search
CPC ............. Y10T 83/6579; Y10T 83/2066; Y10T 83/2068; Y10T 83/156; Y10T 225/30; Y10T 225/304; B23K 26/0846; B23K 26/14; B23K 26/00; B23K 2101/18; B23K 2101/16; B26F 3/004; B26F 3/00; B26F 3/06; B26F 3/16; B65H 20/02; B65H 20/04; B65G 13/02; B65G 13/04; B65G 13/06; B65G 13/065; B65G 13/07; B65G 13/071; B65G 13/11; B65G 13/12; B65G 39/00;
(Continued)

(56) References Cited

U.S. PATENT DOCUMENTS 3,347,121 A * 10/1967 Wiatt ....................... B26D 1/38
83/76.4
3,543,979 A * 12/1970 Hamer .................. C03B 33/091
225/2
(Continued)

FOREIGN PATENT DOCUMENTS

DE 102004034256 B4 4/2007
GB 1287585 A 8/1972

*Primary Examiner* — Phong H Nguyen
(74) *Attorney, Agent, or Firm* — Lucas & Mercanti, LLP

(57) ABSTRACT

A machine for cutting sheets by fluid projection is provided. The machine has a head displaceable in three dimensions, arranged on a support table for supporting sheets to be cut, in which there is a hole for the passage of the cutting fluid, the support table being formed by a set of rollers distributed in two groups of rollers and which determine therebetween the hole, being arranged at the entrance to the support table feed rollers provided with rotary drive action, between which a step for introducing the sheets is determined, in movement on the support table, while a synchronization belt is arranged in relation to one end of the rollers and has displacement drive action combined with the rotary drive action of the feed rollers.

12 Claims, 5 Drawing Sheets

(51) Int. Cl.
  *B26F 3/00* (2006.01)
  *B23K 101/18* (2006.01)
  *B23K 101/16* (2006.01)

(58) Field of Classification Search
  CPC ........ B65G 39/02; B65G 39/10; B65G 39/12; B65G 39/20
  See application file for complete search history.

(56) References Cited

U.S. PATENT DOCUMENTS

| | | | | |
|---|---|---|---|---|
| 3,932,726 | A * | 1/1976 | Verheyen | C03B 33/093 219/121.67 |
| 4,176,566 | A * | 12/1979 | Patterson | B65H 45/101 83/240 |
| 4,790,224 | A * | 12/1988 | Krutilla | B26D 7/0608 198/345.2 |
| 7,395,918 | B2 * | 7/2008 | Thompson | B65G 21/14 193/35 TE |
| 2008/0168876 | A1 | 7/2008 | Kilian et al. | |

* cited by examiner

MACHINE FOR CUTTING SHEETS BY FLUID PROJECTION

CROSS-REFERENCE TO RELATED APPLICATION

This application claims the benefit of priority of Spanish Patent Application No. 201830447, filed May 7, 2018, the content of which is incorporated herein by reference.

TECHNICAL FIELD

The present invention is related to the cutting of sheets of any material by projecting a fluid, for example, by laser emission, without this fluid being limiting; a machine being proposed for this purpose with which certain characteristics are obtained that optimize the efficiency and versatility of the cuts for which the application is intended.

STATE OF THE ART

Making cuts in metal sheets and other materials to obtain shapes or pieces for different applications is known, as is the method of projecting laser or other fluids to accurately cut sheets for such purposes.

In that sense, there are machines for cutting sheets by projecting laser or other fluids, comprising a cutting fluid projection head, located above a support table for supporting the sheets to be cut, with means for moving the sheets through a cutting area located below the cutting fluid projection head.

Thus, for example, documents US 20080168876 A1, DE 102004034256 B4 and GB 1287585 A, among others, describe machines for cutting sheets by fluid projection, with a composition such as the one mentioned, providing a support and transport table for supporting and transporting the sheets to be cut, formed by two successive sets of tables, between which a hole is defined that is located below the cutting fluid projection head, so that when making the cuts, the cutting fluid once it passes through the sheet that is cut passes through that hole defined between the two successive sets of tables, without affecting any other element after the traversed sheet.

Some of said machines even enable the gap defined between the two successive sets of tables to be varied in order to make cuts of different dimensions, using table sets whose length can be modified to vary the distance between the facing edges of both successive sets of tables.

However, currently known machines of this type represent costly solutions and entail many problems, especially when it comes to moving the metal sheet on which the cuts are to be made.

OBJECT OF THE INVENTION

According to the invention, a machine is proposed for making cuts in sheets by projecting a fluid, for example, a laser emission, although it can be any other fluid, with performance characteristics of said machine that make it functionally advantageous for the cutting operation in the mentioned application and having efficiency and versatility.

This cutting machine object of the invention comprises a cutting fluid projection head, said head being provided with a Cartesian movement controlled in three dimensions and arranged above a support table for supporting sheets to be cut, in which there is a free space that defines a through-hole for the cutting fluid after passing through the sheet of application on which cuts are made with the machine.

The support table for supporting the sheets to be cut comprises a set of rollers arranged in free-rotating assembly between carrier belts provided with displacement drive action, the set of rollers being distributed in two groups separated from each other by a space that determines the through-hole for the cutting fluid, with entrance to the support table for supporting the sheets to be cut, between drive rollers that actuate the movement of the sheets to be cut in order to move them along the support table, while a synchronization belt is arranged in connection to one end of the component rollers of the support table and is provided with displacement drive action combined with the drive action of the input rollers to the support table for supporting of the sheets to be cut.

In this way, a cutting machine is obtained in which, when the sheets to be cut are moved on the support table thanks to the action of the input drive rollers, the set of component rollers of the support table moves at the same time, rolling with respect to the sheet to be cut, thanks to the actuation of the synchronization belt, whereby the through-hole for the cutting fluid is moved together with the movement of the sheet to be cut.

On the other hand, by means of the drive action of the carrier belts of the rollers forming the support table, a rolling movement of the support table with respect to the sheet to be cut is obtained and, therefore, a movement of the through-hole for the cutting fluid with respect to the sheet to be cut.

By means of a controlled combination, for example, by means of numerical control, of the movements affecting the cutting fluid projection head on the sheet to be cut and of the support table for supporting the sheet to be cut, a functional activity of the machine can thus be obtained to make very versatile and precise cuts.

The two groups of rollers that form the support table for supporting the sheets to be cut can, if necessary, be incorporated between respective pairs of carrier belts equipped with independent drive action, which can also be varied during the process itself of the functional activity of the cuts with the machine, the dimension of the through-hole for the cutting fluid, thereby enables the cuts made with the machine to be ever more versatile.

Likewise, it is provided that a band is incorporated on the rollers, which is displaced by the movement of the rollers. For this purpose, the roller body is toothed to engage with internal teeth provided in the band. In this way, a more stable movement of the sheet to be cut on the support table is achieved and, in addition, it is possible to use fewer rolls and lower the costs of the machine.

In addition, the machine comprises at least one end roller that carries the band to the end where the pieces resulting from the cuts made in the sheet come out, allowing the minimum size of the resulting piece to be minimal even when the pieces cut into the sheet are to be collected at a collection point arranged at the output of the machine.

Below the cutting area the arrangement of a transverse conveyor belt structured in the form of a grid is also provided, through which the remaining fumes and small particles that are generated in the cuts can pass, while the fragments or larger pieces that result from the cuts are deposited on said conveyor belt that moves them to the exterior.

Given the foregoing, the proposed machine is the result of some very advantageous characteristics for the sheet cutting operation for which it is intended, taking on a life of its own

DETAILED DESCRIPTION OF THE INVENTION

Figure 1:
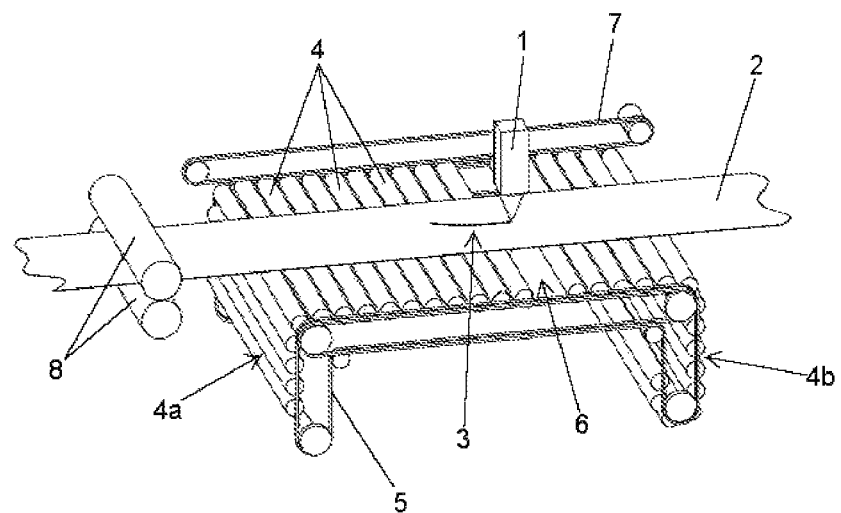
FIG. 1 shows a schematic perspective view of a cutting machine according to the invention, in the process of making a cut on a sheet of application.

The object of the invention relates to a machine for making cuts (3) in sheets (2) of any material, by projecting a laser emission or another fluid capable of passing through the sheets (2) to be cut, comprising a cutting fluid projection head 1!), arranged above a support table for supporting the sheets (2) to be cut, the support table comprising a through-hole (6) for the cutting fluid after passing through the sheet (2) on which cuts (3) are made.

The cutting fluid projection head (1) has displacement drive action controlled in three Cartesian dimensions, such that the support table for supporting the sheets (2) to be cut is formed by a set of rollers (4) that are incorporated in free-rotating assembly between carrier belts (5), preferably arranged at both ends of the rollers (4), which in turn have displacement drive action, the set of the support table comprising two groups of rollers (4a) and (4b) which are separated from one another, determining the through-hole (6) for the cutting fluid, which is located below the position in which the cutting fluid projection head (1) is located.

At the entrance to the support table formed by the rollers (4) there are feed rollers (8) provided with rotary drive action, between which a passage for the sheets (2) to be cut is determined, which are moved by said feed rollers (8) moving longitudinally forward on the support table; while, in relation to one end of the rollers (4) forming the support table, a synchronization belt (7) is arranged, which comes in contact with the end of the rollers (4), preferably by means of engaging or friction, said synchronization belt (7) being provided with displacement drive action combined with the rotary drive action of the feed rollers (8).

This results in a machine assembly with which, by establishing combined control, for example, by means of numerical control, of the Cartesian movement of the head (1), of the displacement movement of the carrier belts (5), of the displacement movement of the synchronization belt (7) and of the rotary movement of the feed rollers (8), with the cutting fluid that the head (1) projects, cuts (3) can be made in a sheet (2) that moves on the support table, so that the cutting fluid after passing through the sheet (2) passes through the hole (6) without affecting any other element; cuts (3) of any configuration can be made in these conditions, since by means of the combination of the drive action of the movements of the head (1), of the drive action of the movement of the carrier belts (5) and of the drive action of the rotation of the feed rollers (8) that move the sheet (2), the hole (6) accompanies the movements of the head (1) so that the cutting fluid passes through said hole (6) at all times, after passing through the sheet (2), when the cuts (3) are made.

In this functionality, when the sheet (2) to be cut is moved on the support table thanks to the drag carried out by the feed rollers (8), the rollers (4) of the support table roll under the sheet (2), whereas, when the displacement movement of the synchronization belt (7) coincides with the rotary movement of the feed rollers (8), the support table moves simultaneously and at the same speed as the sheet (2), so that there is no movement of the rollers (4) of the support table with respect to the sheet (2) and when the displacement movement of the synchronization belt (7) does not coincide with the rotary movement of the feed rollers (8) dragging the sheet (2), the rollers (4) of the support table roll below the sheet (2), without, therefore, friction displacement of the rollers (4) of the support table, with respect to the sheet (2) occurring at any time.

Figure 2:
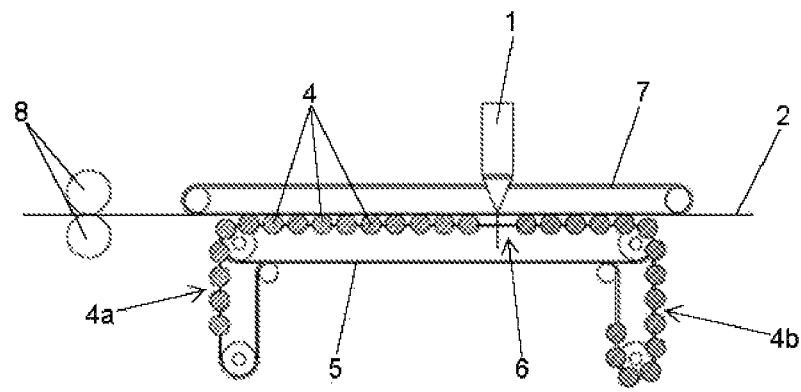
FIG. 2 is a side view of the machine of the previous figure.
Figure 3:
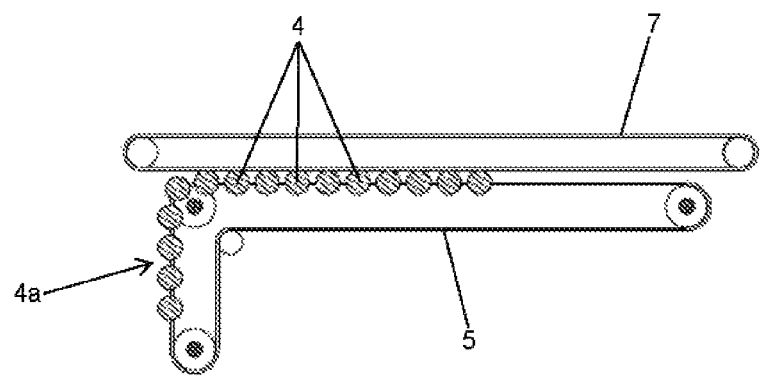
FIG. 3 is a partial side view of the cutting machine, representing the part corresponding to one of the component groups of the support table for supporting the sheets to be cut.
Figure 4:
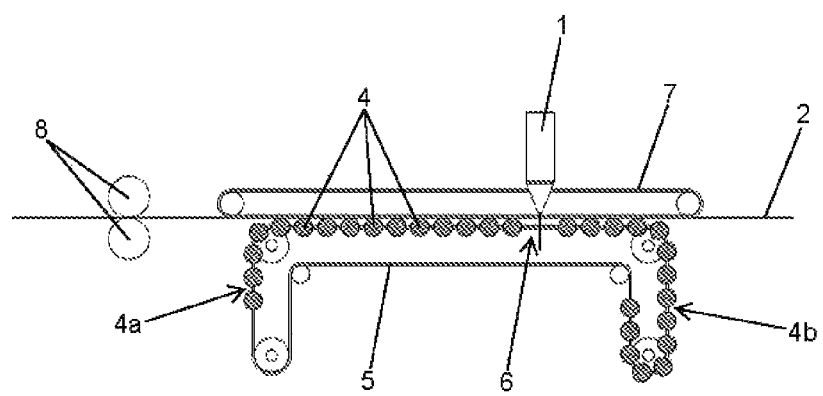
FIG. 4 is a side view of the cutting machine according to an embodiment in which all the rollers of the set of the support table for supporting the sheets to be cut are incorporated between a same pair of carrier belts.

According to one embodiment (FIGS. 1 and 2), the groups of rollers (4a) and (4b) forming the support table are provided incorporated in the assembly between respective pairs of carrier belts (5) provided with independent displacement drive action, a pair at each end of the rollers (4a) and (4b), which enables the dimension of the through-hole (6) for the cutting fluid to be varied, even during the process of the cuts (3), thus also enabling a versatility of the size of the cuts (3), without the need for a prior adjustment of the machine for the cuts (3) that are to be made.

Figure 6:
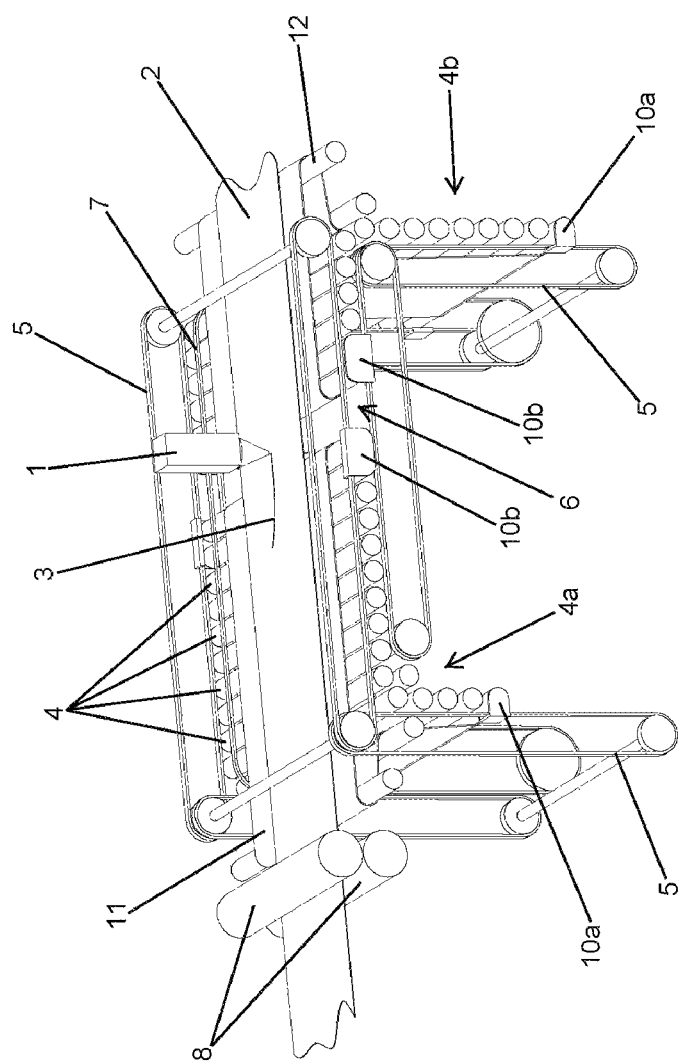
FIG. 6 is a perspective view of the cutting machine provided with a band that is arranged between the rollers and the sheet to be cut.
Figure 7:
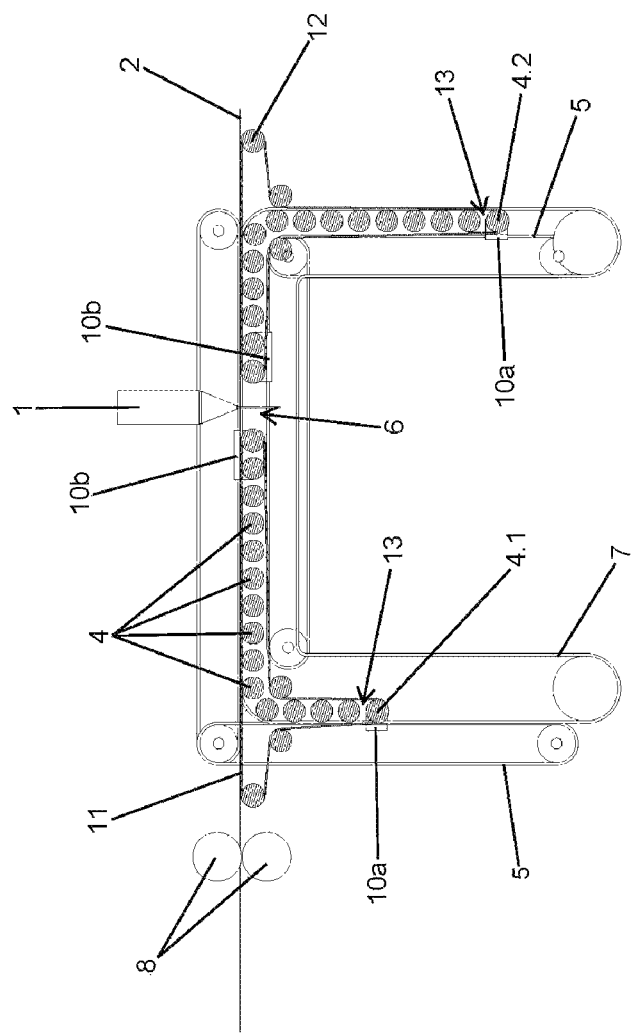
FIG. 7 is a cross-section view of the machine of the previous figure.

Preferably, as can be seen in FIGS. 6 and 7, one of the carrier belts (5) of the pair of carrier belts (5) of each group of rollers (4a) and (4b) is arranged above its group of rollers (4a) and (4b), while the other carrier belt (5) of the pair of carrier belts (5) is arranged below its group of rollers (4a) or (4b), depending on the direction of movement of the synchronization belt (7), producing the displacement of each group of rollers (4a) and (4b) above or below, which causes the invention to operate better.

Figure 5:
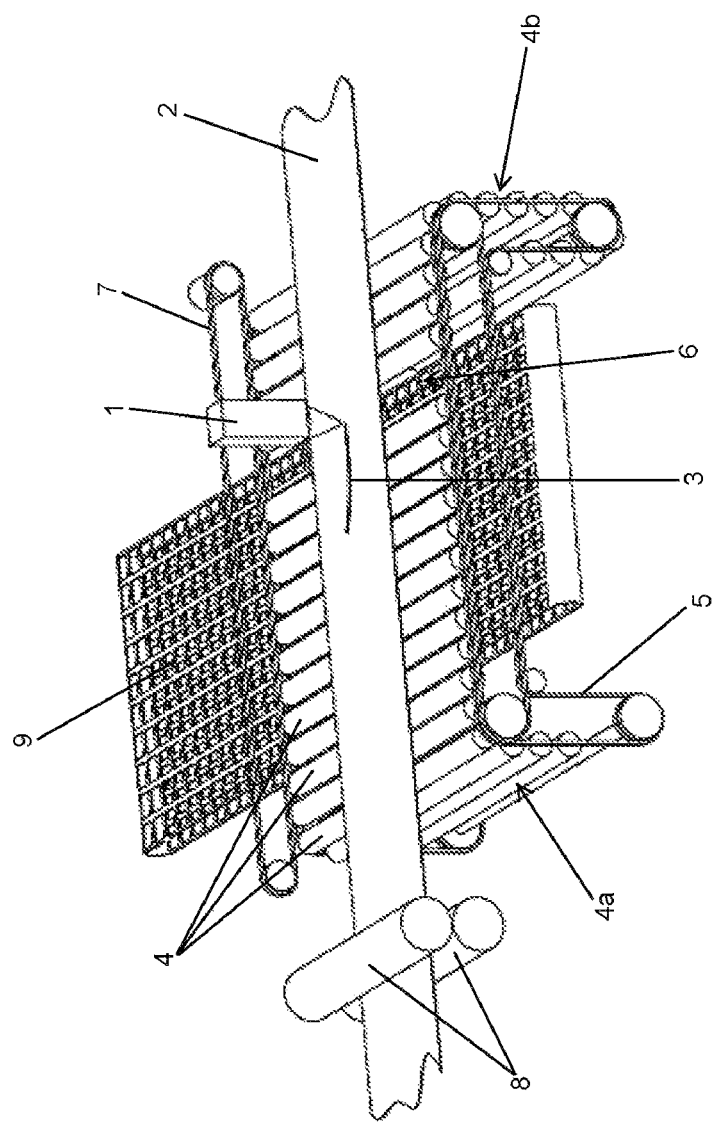
FIG. 5 is a perspective view of the cutting machine provided with a lower transverse belt for collecting the pieces and fragments resulting from the cuts made in the sheets of application.

However, in a simplified embodiment of a more economic nature, the groups of rollers (4a) and (4b) components of the support table can be incorporated in the assembly between a single pair of carrier belts (5), as shown in FIG. 5, which remains equally within the object of the invention, since it enables, while keeping the dimension of the hole (6) fixed, cuts (3) to be made in sheets (2) accompanying the through-hole (6) for the cutting fluid with movements of the cutting fluid projection head (1).

Likewise, between the carrier belts (5) and the rollers (4) there are connection elements (10a and 10b) that enable the movement of the carrier belts (5) to be transmitted to the rollers (4). Preferably, as shown in FIGS. 6 and 7, a connection element (10b) is attached which joins two rollers (4) adjacent to the hole (6) of each group of rollers (4a and 4b) with their respective carrier belts (5) and another connection element (10a) which joins the roller (4) farthest from the hole (6) of each group of rollers (4a and 4b) with their respective carrier belts (5). In this way, since the rollers (4) of each group of rollers (4a and 4b) are interconnected, the rotation of the respective carrier belts (5) causes the displacement of all the rollers (4) of each group of rollers (4a and 4b) by means of the connection elements (10a and 10b).

When the synchronization belt (7) comes in contact with the end of the rollers (4) by engagement, preferably the synchronization belt (7) is configured so that it is engaged with all the rollers (4) of the machine, and not only with the rollers in the horizontal plane that act as a support table. For this purpose, the synchronization belt (7) is configured in the shape of an inverted "u", so that it is engaged with all the rollers (4), both those that are in vertical planes and those in the horizontal plane acting as the support table. In this way, the problems caused by the lack of synchronization between the rollers (4) that were not engaged upon coming in contact with the synchronization belt (7) are avoided.

In a complementary manner, and as seen in FIGS. 6 and 7, on the rollers (4) a band (11) is incorporated, which is displaced by the movement of the rollers (4). For this reason, the body of the rollers (4) is toothed to engage with internal teeth of the band (11). In this way, a more stable displacement of the sheet (2) to be cut on the support table is achieved and, in addition, it is possible to use fewer rollers (4) and reduce the costs of the machine.

Likewise, the machine preferably comprises at least one end roller (12) that carries the band (11) to the end through which the pieces resulting from the cuts (3) made in the sheet (2) leave. This enables the minimum size of the resulting piece to be minimal even when the resulting pieces are to be collected at the machine outlet, since the band (11) reaches the collection point at the machine outlet without leaving spaces (or these spaces being practically null). In this way, the fact of having to compulsorily obtain the small pieces through the through-hole (6) for the cutting fluid is avoided, since without a band (11), the small pieces would fall in the space between the rollers (4) and said collection point at the machine outlet.

Preferably, a space (12) is arranged between an initial roller (4.1) and a final roller (4.2) (arranged one at each end of the roller assembly (4)) and their adjacent rollers (4), which avoids a possible collision between the rollers (4), since relative displacements between the rollers (4) and said spaces (13) that absorb the said relative displacements can occur.

In addition, it is provided that a transverse conveyor belt (9), formed with a grid structure, is arranged under a cutting area and through it the fumes and small residual particles of the cuts (3) can pass for the extraction of said residues, while the larger pieces and fragments resulting from making the cuts (3) are deposited on said conveyor belt (9), for its removal to the exterior, thus facilitating the collection of said pieces and fragments resulting from the cuts (3).

The invention claimed is:

1. A machine for cutting sheets by fluid projection comprising
    a support table for supporting sheets to be cut, the support table comprising two pair of carrier belts and a plurality of rollers distributed into a first set of plurality of rollers and a second set of plurality of rollers, and a through-hole between the first set and second set of plurality of rollers;
    a cutting fluid projection head equipped with Cartesian movement configured to move in three dimensions, the projection head arranged above the support table and over the through-hole;
    feed rollers located at one end of the support table configured to receive the sheets to be cut, the feed rollers provided with rotary drive action;
    a synchronisation belt arranged at one end of the plurality of rollers, the synchronization belt being in contact with the plurality of rollers and having a displacement drive action combined with a rotary drive action of the feed rollers,
wherein the plurality of rollers are assembled in a free-rotating assembly between the two pair of carrier belts, and wherein the plurality of rollers between the two pair of carrier belts are equipped with independent displacement drive action.

2. The machine for cutting sheets by projecting fluids according to claim 1, wherein the synchronisation belt is related to the rollers of the support table by means of a transmission by engagement.

3. The machine for cutting sheets by projecting fluids according to claim 2, wherein the synchronisation belt is configured so that it is engaged with the plurality of rollers of the machine.

4. The machine for cutting sheets by projecting fluids according to claim 1, wherein the synchronisation belt is related to the rollers of the support table by means of transmission by friction.

5. The machine for cutting sheets by projecting fluids according to claim 1, wherein the supporting table has two ends and further comprises additional two pair of carrier belts, a third set of plurality of rollers and a fourth set of plurality of rollers arranged respectively at both end of the support table, and wherein the third set and fourth set of plurality of rollers are assembled in a free-rotating assembly between the additional two pair carrier belts.

6. The machine for cutting sheets by fluid projection according to claim 1, wherein connection elements are arranged between the carrier belts and the rollers that enable the movement of the carrier belts to be transmitted to the rollers.

7. The machine for cutting sheets by fluid projection according to claim 1, further comprising additional two pairs of carrier belts wherein one of the carrier belts of the pair of carrier belts is arranged above the first set of and second set of plurality of rollers, while the additional two pairs carrier belts is disposed below the first set of and second set of plurality of rollers.

8. The machine for cutting sheets by fluid projection according to claim 1, wherein the plurality of rollers that make up the support table are arranged in assembly between the same carrier belts equipped with displacement drive action.

9. The machine for cutting sheets by fluid projection according to claim 1, wherein on the plurality of rollers a band is incorporated, which is displaced by the movement of the plurality of rollers, a body of the plurality of rollers being toothed to engage with an inner teeth of the band.

10. The machine for cutting sheets by fluid projection according to claim 9, further comprising at least one end roller that carries the band to an end of the machine through which pieces resulting from the cuts made in the sheet leave the supporting table.

11. The machine for cutting sheets by fluid projection according to claim 9, wherein between an initial roller and a final roller and corresponding adjacent rollers there is a space that avoids a possible collision between the plurality of rollers.

12. The machine for cutting sheets by fluid projection according to claim 1, wherein a transverse conveyor belt formed by a grid structure is arranged below a cutting area.

* * * * *